United States Patent
Kuskie

(10) Patent No.: US 7,909,735 B1
(45) Date of Patent: Mar. 22, 2011

(54) SUDDEN ACCELERATION ELIMINATOR SYSTEM

(76) Inventor: William E. Kuskie, Elizabeth, PA (US)

( * ) Notice: Subject to any disclaimer, the term of this patent is extended or adjusted under 35 U.S.C. 154(b) by 0 days.

(21) Appl. No.: 12/859,796

(22) Filed: Aug. 20, 2010

Related U.S. Application Data

(60) Provisional application No. 61/265,395, filed on Dec. 1, 2009.

(51) Int. Cl.
*B60W 10/18* (2006.01)
(52) U.S. Cl. .................................................. 477/187
(58) Field of Classification Search .................. 477/183, 477/187, 190
See application file for complete search history.

(56) References Cited

U.S. PATENT DOCUMENTS

| | | |
|---|---|---|
| 4,146,108 A | 3/1979 | Sato |
| 4,345,663 A | 8/1982 | Shields |
| 4,445,603 A | 5/1984 | Filsinger |
| 5,193,640 A | 3/1993 | Lee |
| 5,491,466 A | 2/1996 | Maiocco, Jr. |
| 5,810,107 A | 9/1998 | Krel |
| 7,448,983 B2 * | 11/2008 | Doering et al. ............... 477/183 |

\* cited by examiner

*Primary Examiner* — Dirk Wright
(74) *Attorney, Agent, or Firm* — McKay & Associates, P.C.

(57) ABSTRACT

A safety system for a motor vehicle which prohibits the sudden acceleration of the vehicle as a result of hydraulic brake pressure. The throttle-control system of the vehicle is bypassed by providing an ignition switch connecting a starter to a battery, the battery providing voltage for an internal combustion engine of the motor vehicle. A brake pressure switch is connected to the ignition switch and to a brake master cylinder for receiving brake fluid under hydraulic pressure upon actuation of a brake pedal. An ignition coil means transforms and increases the voltage for the engine. Finally, a limiter set at a specific revolutions per minute (RPM) to limit output of the engine is connected to the brake pressure switch and to the ignition coil, the limiter reacting to the voltage when the brake pressure switch is closed by the hydraulic pressure from the brake pedal.

3 Claims, 3 Drawing Sheets

SUDDEN ACCELERATION ELIMINATOR SYSTEM

CROSS-REFERENCE TO RELATED APPLICATIONS

The instant application claims benefit of provisional application Ser. No. 61/265,395, filed Dec. 1, 2009, the disclosure of which is herein incorporated by reference.

BACKGROUND

1. Field of the Invention

The instant invention relates to systems and methods for use with automobiles to enhance their safety by eliminating the ability for the vehicle to accelerate suddenly as a result of accelerator system malfunction or accidental actuation of the gas pedal.

2. Description of the Related Art

The number of reported deaths linked to sudden acceleration of vehicles has increased dramatically and forced major car companies to re-evaluate their technology, indeed force the recall of millions of vehicles. Without some form of system configured to override the accelerator, a stuck gas pedal will continuously increase the speed of a moving vehicle even with brake pressure applied.

Furthermore, notwithstanding the possibility of faulty technology itself that results in acceleration of the vehicle even when the gas pedal is not intentionally depressed, accidental concurrent actuation of both the brake and gas pedal commonly occurs as a result of driver panic. In emergent circumstances a driver may attempt to forcefully slam on the brakes but accidentally hit both the brake pedal and the gas pedal at the same time. The vehicle thus fails to stop and actually will accelerate as the power of the vehicle outweighs the braking capability. Injury or death to driver, passengers, pedestrians, and property damage can result, and indeed has resulted forcing the need for further vehicle recalls, investigations, and safety overhauls.

In some instances simultaneous depressing of gas and brake pedal occurs if the driver has limited feeling in his or her feet or legs from particular ailments. Mistakenly believing he is depressing the brake pedal only, the driver will accidentally cause the vehicle to accelerate if both the gas pedal and brake pedal are concurrently pushed. These situations occur even more frequently for sport or coup-type automobiles which have smaller interiors wherein the gas pedal and brake pedal are situated extremely close to one another.

Known in the art are means to control the throttle of a vehicle or allow the accelerator to act as a brake. In other words, a vehicle can be modified to control its speed or braking without actually using the brake pedal. For instance, U.S. Pat. No. 4,146,108 teaches a braking system responsive to abrupt release of an accelerator pedal which is solenoid-actuated and includes a brake force doubling mechanism to accommodate driver-actuated operation. U.S. Pat. No. 4,345,663 shows a speed governor with dual safety system for motor vehicle which has a control circuit for controlling the accelerator and the decelerator with a brake switch for throttle release. U.S. Pat. No. 4,345,663 describes an automatic throttle valve control for an internal combustion engine which has a protective circuit for a throttle valve with a servo motor and idling return device. U.S. Pat. No. 5,193,640 shows a vehicle safety system for driver pedal misapplication using excessive pressure applied on the accelerator by driver to reduce speed and apply brakes. U.S. Pat. No. 5,491,466 describes a motor vehicle brake light control apparatus comprising a timing circuit which inserts a delay before illuminating the brake light as a result of engaging the clutch system or idling throttle system. U.S. Pat. No. 5,810,107 is a one pedal safety driving system or braking control system for motor vehicle which includes an interrupter unit that disconnects the output current unit to reset the vehicle to acceleration state based on pushing of the pedal.

Certainly then a vehicle can be modified to control its speed or braking without actually using the brake pedal, but as above this is traditionally done by using circuit-controlled speed governors or other accelerator-attached bypass systems and safety devices used as throttle controls. There is a need then to bypass the acceleration system using an alternative system and method which bypasses the throttle-control system when actual brake pressure is applied, as follows.

SUMMARY

Disclosed is a system and method for eliminating sudden acceleration of a vehicle due to the accidental concurrent actuation of both the brake and gas pedal or due to accelerator pedal malfunction. The system eliminates acceleration of the vehicle when brake pressure on the brake pedal is applied, thus eliminating acceleration regardless of actuation or malfunction of the accelerator pedal or any related acceleration component.

The invention thus comprehends a safety system for a motor vehicle, comprising an ignition switch connecting a starter to a battery, the battery providing voltage for an internal combustion engine of the motor vehicle. A brake pressure switch is connected to the ignition switch and to a brake master cylinder for receiving brake fluid under hydraulic pressure upon actuation of a brake pedal. An ignition coil means transforms and increases the voltage for the engine. Finally, a limiter set at a specific revolutions per minute (RPM) to limit output of the engine is connected to the brake pressure switch and to the ignition coil, the limiter reacting to the voltage when the brake pressure switch is closed by the hydraulic pressure from the brake pedal, wherein, with brake pressure, the output of the vehicle could never exceed the specific RPM, such that upon simultaneous depression of both a gas pedal and the brake pedal the motor vehicle resists acceleration.

Accordingly, in an internal combustion motor vehicle including a gas pedal, a brake pedal, a power source, a brake pressure switch, an ignition coil, and a tachometer, provided is a method for enhancing safety of the motor vehicle, the method comprising the steps of mounting a limiter within a compartment of the motor vehicle, the limiter including multiple connecting wires; connecting one wire of the limiter to a ground; connecting another of the wires to the brake pressure switch; connecting another of the wires to a negative terminal of the ignition coil; then, optionally, connecting another of the wires to an output of the tachometer; wherein upon simultaneous depression of both the gas pedal and the brake pedal the motor vehicle resists acceleration.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications and applications as would normally occur to persons skilled in the art to which the invention relates. This detailed description of this invention is not meant to limit the invention, but is meant to provide a detailed disclosure of the best mode of practicing the invention.

Figure 1:
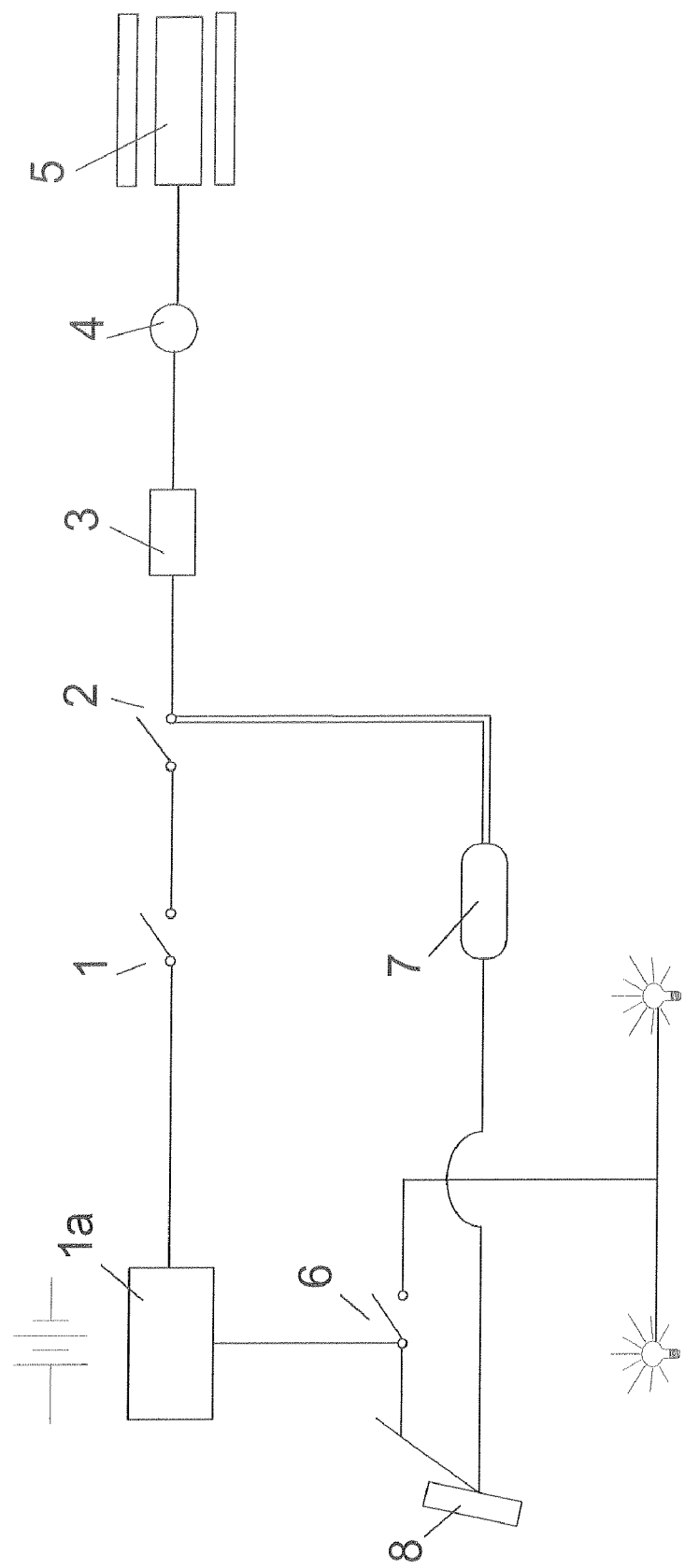
FIG. 1 shows a schematic of the overall system and method.

With reference then to FIG. 1, the instant invention is a system and method for eliminating sudden acceleration of a vehicle due to the accidental concurrent actuation of both the brake and gas pedal. To function properly, the typical vehicle well-suited to implement the instant system and methodology is an internal combustion-type vehicle including an ignition switch 1 connecting the starter to the battery 1a. A brake pressure switch 2 is then connected to the brake master cylinder 7 for receiving brake fluid under hydraulic pressure upon actuation of brake pedal 8. Ignition coil 4 is an induction coil for transforming and increasing battery voltage to spark plug requirements for engine 5. Brake light switch 6 is wired into assembly of brake pedal 8.

Critically for the instant invention, in a vehicle having the above or similar components, a means for limiting the RPM (revolutions per minute) of the vehicle is then wired to brake pressure switch 2. The means for limiting the RPM preferably includes a micro processor-based, digital limiter 3. Limiter 3 reacts to voltage when brake pressure switch 2 is closed by brake pressure. Limiter 3 is adjustable to vary the pre-set RPM level. Thus, limiter 3 reacts to preset acceleration, and limiter 3 is not on-line until brake pressure switch 2 is closed, giving limiter 3 voltage to react to acceleration. In the instant embodiment the RPM level is set low, preferably between 100 and 2000 RPM. Limiter 3 is connected directly to the brake pressure switch 2 such that, with brake pressure, acceleration could never exceed the specific RPM.

Figure 2:
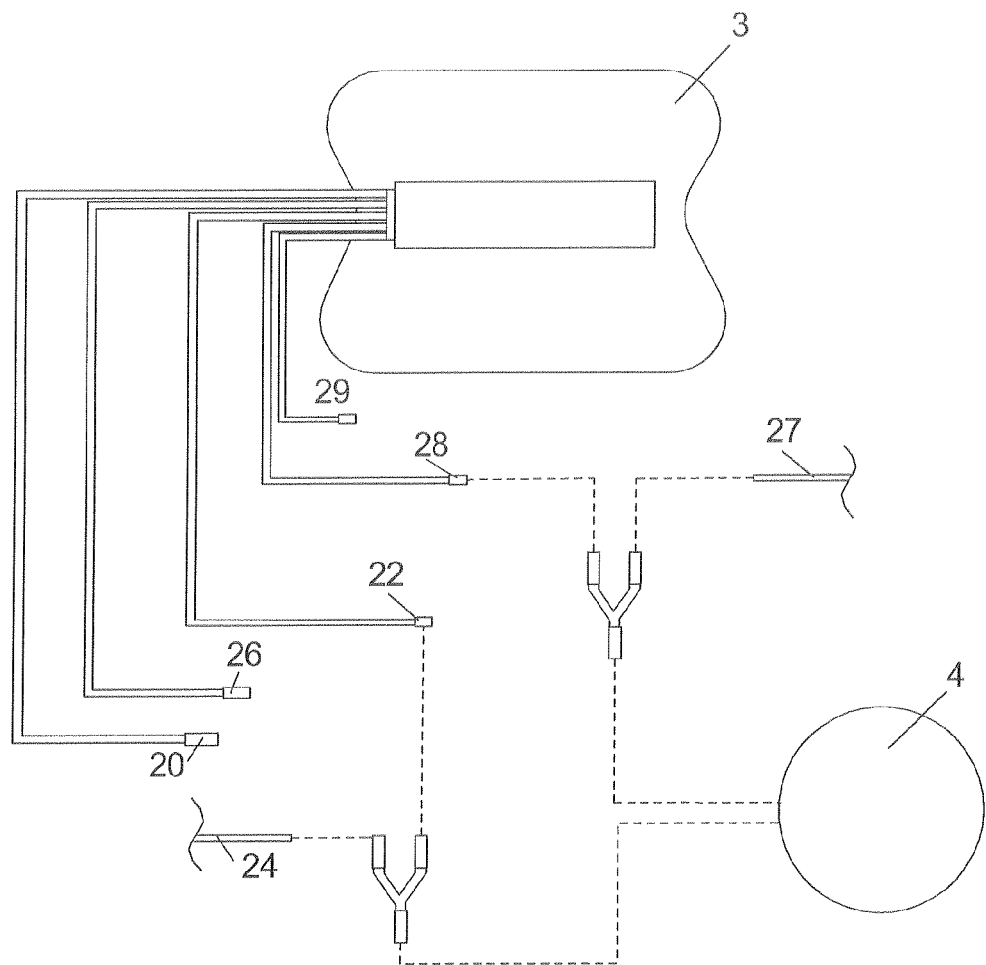
FIG. 2 shows an illustration of a prior art limiter set-up as connected to an ignition system.

FIG. 2 shows a prior art diagrammatic illustration of the typical limiter 3, or rev-limiter as sometimes termed in the art, connected to a standard ignition system. A specific brand or type of rev-limiter need not be employed. However in the instant application a microprocessor-based, digital rev-limiter manufactured by Pertronix is used as an example. This particular limiter 3 includes five wires for connection to the system. A limiter 3 typically includes five wires, four of which are used. The color of wires used depends on the type of ignition system in place, namely whether the system is an HEI or Non-HEI system. HEI systems are defined as systems which have current limited circuitry, whereas Non-HEI systems include all other inductive type single coil ignitions. It should be understood then that the instant system and methodology could be used for any type of OEM electronic or aftermarket inductive type ignition system also.

Shown generally is a prior art set-up for an HEI system with connected limiter 3. The limiter 3 would be mounted on a relatively flat, isolated surface proximate to the ignition system within the engine compartment using screws or similar. Black wire 20 is attached to a suitable engine ground. Red wire 22 connects to a twelve (12) volt power source controlled by the ignition switch 24. The orange wire 28 is connected to the negative terminal of the ignition coil 4. For HEI type systems, the yellow wire 26 is not used and can be isolated. For Non-HEI type systems the orange wire 28 would not be used and the yellow wire 26 in turn would be attached to the coil's negative terminal and the orange 28 in turn would not be used. The white wire 29 is a tachometer output, which would be compatible with most modern tachometers as is known in the art and therefore would attached to original tachomer (tach) wire 27. Thus, the in-place rev limiter 3 is implemented traditionally to decrease engine wear. Limiter 3 in this prior art arrangement prevents damage to an engine by interrupting the power that is distributed to the spark plugs, which prevents the engine from operating above a pre-determined RPM level known as the red-line. Limiters can be also be used in conjunction with a shift light, which illuminates when the desired RPM is reached. In either instance, it would be customary then that the pre-set RPM redline would be high—just high enough to achieve maximum acceleration but without harming the vehicle's engine.

Figure 3:
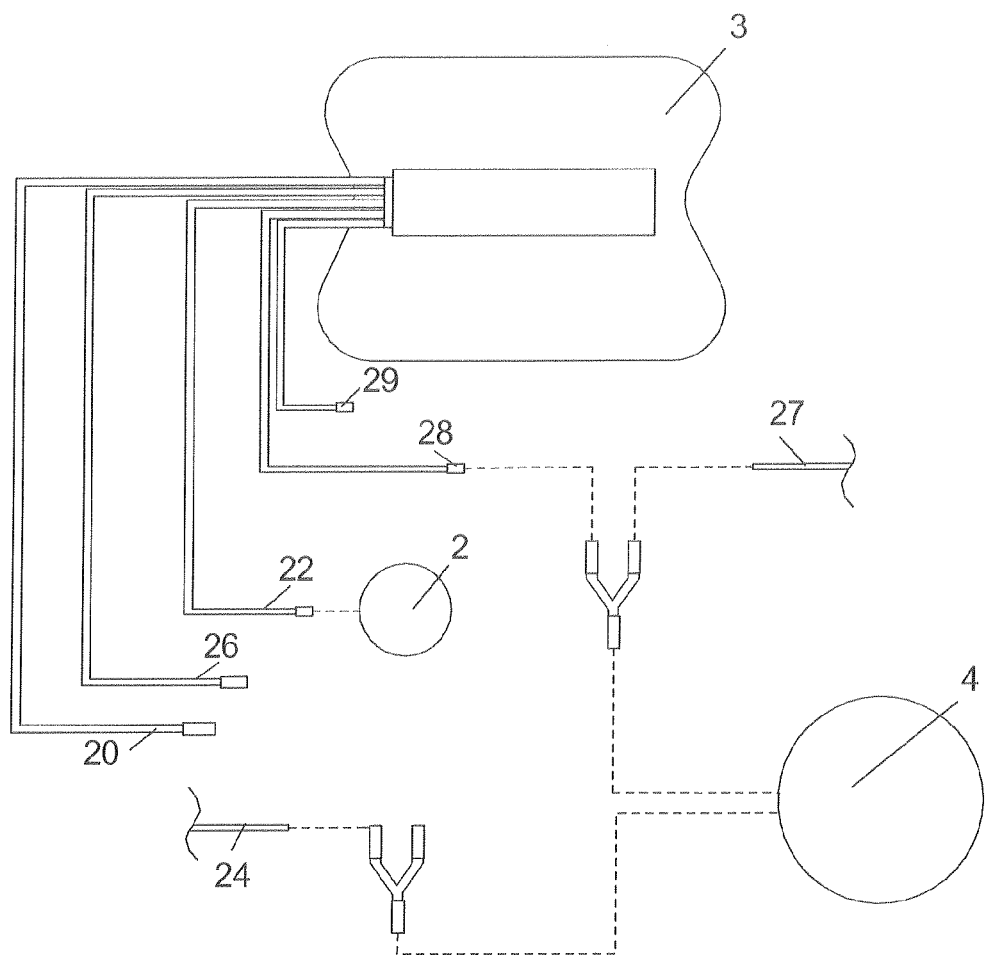
FIG. 3 shows an illustration of how the instant system and method is connected to an ignition system and brake pressure switch.

FIG. 3 shows the illustration of the instant invention. In the instant embodiment, a three-wire hook-up is employed regardless of the number of wires or connectors on the limiter 3. In this particular application the limiter 3 reacts to the brake pressure of the vehicle and not the acceleration level. Specifically, black wire 20 connects to ground. Red wire 22 is attached to the brake pressure switch 2, which picks up the voltage. Finally, the orange wire 28 connects to the negative terminal of the ignition coil 4. The remaining (e.g. yellow wire 26) need not be used. Also optional is the use of the white tachometer output wire.

Rev limiter 3 is set by using any variety of switches on the limiter 3. For instance through rotary switches all settings can be done externally and manually using a small flat blade screw driver to make adjustments. Using the switches and settings the limiter 3 and thus the rev limit can be set between 100 and 9900 in increments of 100 RPM. In the instant embodiment used to bypass the acceleration the rev-limiter preferably is set in the range of 100 and 2000 RPM. A cylinder selection switch, if present on the limiter 3, can also be rotated to indicate the proper vehicle cylinder number for the particular application. Some models of limiters may only operate in four, six, and eight cylinder modes for example.

Therefore, now in use and connected as shown, even with simultaneous actuation of the gas pedal and brake pedal, as long as there is hydraulic (brake) pressure, acceleration could not exceed the pre-set RPM and thus the force of the braking will outweigh the force of the acceleration. As a result, the acceleration/throttle-control system is completely bypassed when the unintentional depressing of the gas pedal occurs as long as the brake is also being depressed, and the vehicle resists sudden acceleration at such a low RPM and thereby reduces the risk of injury or death.

As above, limiters are typically implemented to decrease engine wear. Limiters prevent damage to an engine by interrupting the power that is distributed to the spark plugs, which prevents the engine from operating above a pre-determined RPM level known as the red-line. Limiters can be also be used in conjunction with a shift light, which illuminates when the desired RPM is reached. In either instance, it would be customary that the pre-set RPM redline would be high—just high enough to achieve maximum acceleration but without harming the engine. In this particular application however, the limiter 3 reacts to the brake pressure and riot the acceleration level. As above, as opposed to being set high, the limiter 3 is set to a low RPM and is actuated upon depressing the brake as opposed to the gas pedal. In a situation where the driver tries to suddenly depress the brake pedal to avoid a collision for example, if the driver misses the entire brake pedal and accidentally hits both the brake pedal and the gas pedal, acceleration of the vehicle cannot occur because the car will not exceed the pre-set RPM level. It should be understood that using the instant configuration the limiter is not simply acting as a speed governor because the instant system limits the RPM of the vehicle when brake pressure is sensed, which is desirable since the motor vehicle operation and acceleration is never affected unless it is the driver's intention to slow down or stop. As long as brake pressure is applied, the vehicle cannot accelerate, thereby enhancing the safety of the vehicle and protecting the driver, pedestrians, and the vehicle itself. The vehicle can only accelerate by intentional and sole use of the gas pedal.

I claim:

1. A safety system for a motor vehicle, comprising:
    an ignition switch connecting a starter to a battery, said battery providing voltage for an internal combustion engine of said motor vehicle;
    a brake pressure switch connected to said ignition switch and to a brake master cylinder for receiving brake fluid under hydraulic pressure upon actuation of a brake pedal;
    an ignition coil means for transforming and increasing said voltage for said engine;
    a limiter set at a specific revolutions per minute (RPM) to limit output of said engine, said limiter connected to said brake pressure switch and to said ignition coil, said limiter reacting to said voltage when said brake pressure switch is closed by said hydraulic pressure from said brake pedal, wherein with said hydraulic pressure said output of said vehicle could never exceed said specific RPM, such that upon simultaneous depression of both a gas pedal and said brake pedal said motor vehicle resists acceleration.

2. In an internal combustion motor vehicle including a gas pedal, a throttle-control system, a brake pedal, a power source, a brake pressure switch, an ignition coil, and a tachometer, a method for enhancing safety of said motor vehicle, the method comprising the steps of:
    mounting a limiter within a compartment of said motor vehicle, said limiter including multiple connecting wires;
    connecting one wire of said limiter to a ground;
    connecting another of said wires to said brake pressure switch;
    connecting another of said wires to a negative terminal of said ignition coil;
    wherein upon simultaneous depression of both said gas pedal and said brake pedal said throttle-control system is entirely bypassed and said motor vehicle resists acceleration.

3. The method of claim 2, further comprising the step of setting said limiter in the range of 100 and 2000 RPM.

* * * * *